United States Patent
Saha et al.

(10) Patent No.: US 7,516,313 B2
(45) Date of Patent: Apr. 7, 2009

(54) PREDICTING CONTENTION IN A PROCESSOR

(75) Inventors: Bratin Saha, San Jose, CA (US);
Matthew C. Merten, Hillsboro, OR (US); Sebastien Hily, Hillsboro, OR (US); David A. Koufaty, Portland, OR (US); Per Hammarlund, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 349 days.

(21) Appl. No.: 11/027,392

(22) Filed: Dec. 29, 2004

(65) Prior Publication Data

US 2006/0161738 A1 Jul. 20, 2006

(51) Int. Cl.
*G06F 13/376* (2006.01)
*G06F 9/38* (2006.01)
*G06F 13/18* (2006.01)

(52) U.S. Cl. .................. 712/239; 712/236; 712/237; 710/108; 710/240; 710/107; 710/40; 710/244; 711/150; 711/163

(58) Field of Classification Search .............. None
See application file for complete search history.

(56) References Cited

U.S. PATENT DOCUMENTS

| | | | | |
|---|---|---|---|---|
| 5,161,227 A | * | 11/1992 | Dias et al. ............... | 718/104 |
| 6,032,242 A | * | 2/2000 | Lin ......................... | 711/217 |
| 6,247,121 B1 | | 6/2001 | Akkary et al. ............ | 712/239 |
| 6,651,088 B1 | * | 11/2003 | Zhang et al. ............. | 709/213 |
| 7,120,762 B2 | | 10/2006 | Rajwar et al. ............ | 711/150 |
| 2002/0078284 A1 | * | 6/2002 | McKenney ............... | 710/200 |
| 2002/0199113 A1 | * | 12/2002 | Pfister et al. ............. | 713/200 |
| 2003/0065704 A1 | * | 4/2003 | Buch ...................... | 709/107 |

OTHER PUBLICATIONS

Odaira et al., "Selective Optimization of Locks by Runtime Statistics and Just-in-Time Compilation", Proceedings of International Parallel and Distributed Processing Symposium, 2003, IEEE, pp. 6, Apr. 2003.*
Ravi Rajwar, et al., "Speculative Lock Elision: Enabling Highly Concurrent Multithreaded Execution," Dec. 3-5, 2001, pp. 1-12.

* cited by examiner

*Primary Examiner*—Brian R Peugh
(74) *Attorney, Agent, or Firm*—Trop, Pruner & Hu, P.C.

(57) ABSTRACT

In one embodiment, the present invention includes a predictor to predict contention of an operation to be executed in a program. The operation may be processed based on a result of the prediction, which may be based on multiple independent predictions. In one embodiment, the operation may be optimized if no contention is predicted. Other embodiments are described and claimed.

31 Claims, 4 Drawing Sheets

PREDICTING CONTENTION IN A PROCESSOR

BACKGROUND

The present invention relates to computer systems, and more particularly to such systems executing multiple threads.

Computer systems including multiprocessor (MP) and single processor systems may include a plurality of "threads," each of which executes program instructions independently from other threads. Use of multiple processors or threads allows various tasks or functions and even multiple applications to be handled more efficiently and with greater speed. Utilizing multiple threads or processors means that two or more processors or threads can share and simultaneously access the same data stored within the system. However, care must be taken to maintain memory ordering when sharing data.

For data consistency purposes, if multiple threads or processors desire to read, modify, and write to a single memory location, the multiple agents should not be allowed to perform operations on the data simultaneously. Further complicating the use of multiple processors is that data is often stored in a cache associated with a processor to speed access to the data by that processor. Because such caches are typically localized to a specific processor, the most recent update to the data could be located in any one of the caches in the system. Any agent accessing this data should receive a valid or updated data value from the cache with the most recent update, and data being written from the cache back into memory or transferred to other caches must be the current data so that cache coherency is maintained.

Multithreaded (MT) software uses different mechanisms to interact and coordinate between different threads. One common form of MT synchronization is a semaphore spin-lock. A semaphore spin-lock mechanism is a lock operation used to guarantee mutual exclusion (i.e., prevent simultaneous access) across multiple threads while accessing a shared memory variable or structure (i.e., a shared element). In order to provide a unique and consistent view of the shared element, it is guarded by a lock variable. Every thread needing access to the shared element must acquire the guarding lock via an atomic semaphore operation. To acquire the lock, a thread essentially reads the value of the lock variable, compares the value to a predetermined 'free' value, and then writes a 'lock' value. This read-modify-write operation must appear to happen in one step so that multiple threads do not read a 'free' value and simultaneously write the 'lock' value, thus allowing both threads to believe they have acquired the lock.

After a given thread acquires a lock on a lock variable, other threads desiring to access the lock variable typically must wait until the original thread completes its lock operation. Typically, other threads seeking access will initiate a snoop on the address of the lock variable to check the state (i.e., 'free' or 'locked'). A thread that finds the 'locked' value will often wait a short time and snoop again, thus spinning in a small snoop-wait loop. Contention occurs when one or more threads desire access to a lock variable already owned (i.e., locked) by another thread or access to a lock variable being accessed by another thread. A lock operation is uncontended when, during runtime, only one agent seeks to execute a lock operation on the lock variable at a time. A thread will write the 'free' value back into the lock variable when it is finished modifying the shared variable or structure.

Because synchronization occurs frequently in MT applications, a processor should efficiently implement lock operations so that the MT applications may perform as desired. If a lock operation is uncontended at runtime, it can be heavily optimized. Such optimizations can include speculative prefetching of an associated cache line, lock elision, and the like. However, these optimization techniques incur a significant penalty if the lock operation is contended.

A need therefore exists to predict contended lock operations, thereby enabling a processor to efficiently implement lock operations.

DETAILED DESCRIPTION

Figure 1:
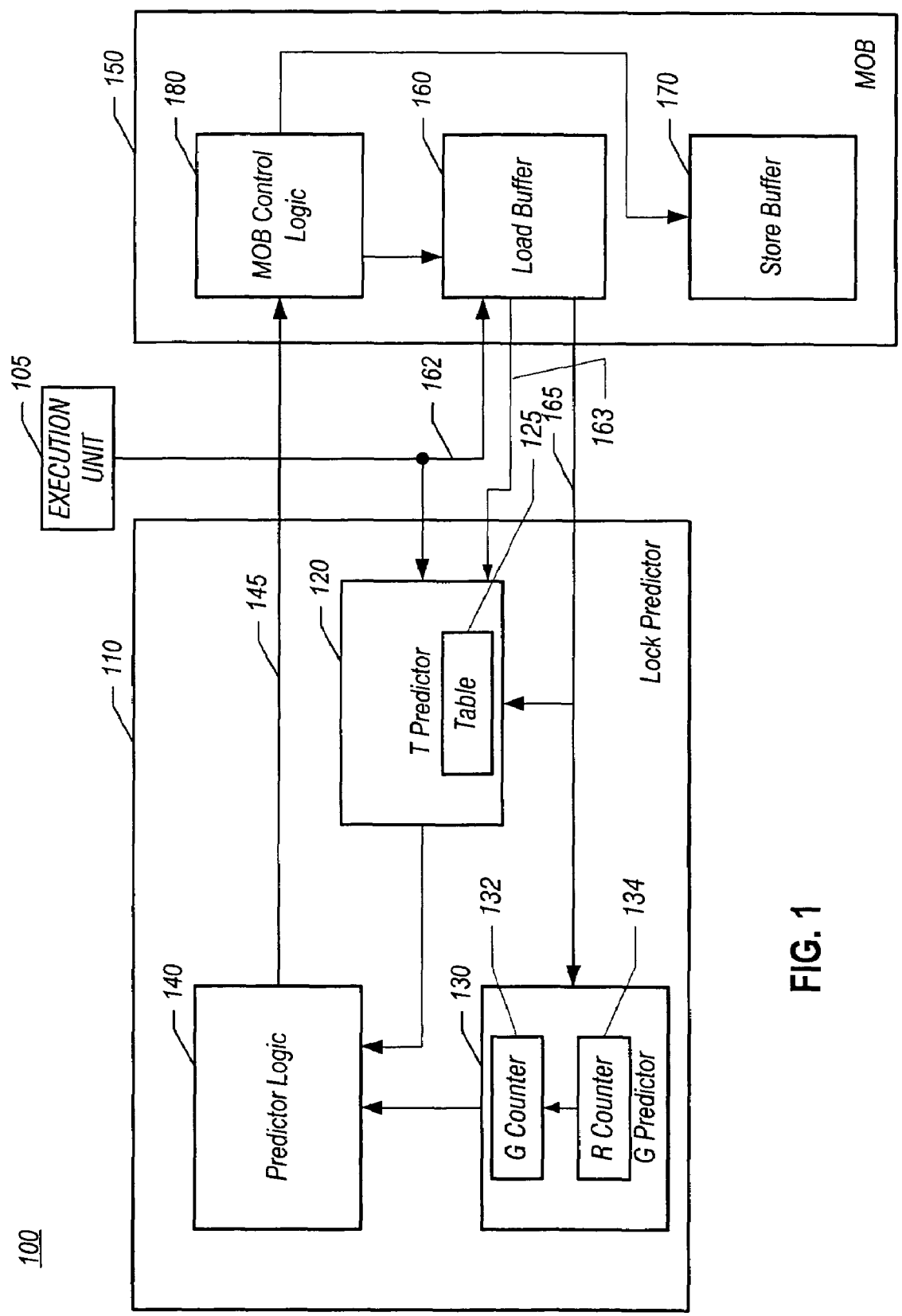
FIG. 1 is a block diagram of a portion of a processor in accordance with one embodiment of present invention.

Referring to FIG. 1, shown is a block diagram of a portion of a processor 100 in accordance with one embodiment of present invention. As shown in FIG. 1, processor 100 includes a lock predictor 110 and a memory order buffer (MOB) 150. While shown in FIG. 1 with only these components, it is to be understood that processor 100 may include additional components such as a data cache, a branch prediction unit, pipeline stages, various registers and the like.

Lock predictor 110 may be used to predict whether a lock operation within a program is likely to be contended during execution. In the embodiment of FIG. 1, lock predictor 110 includes a first predictor (i.e., a table or T predictor) 120 and a second predictor (i.e., a global or G predictor) 130. T predictor 120 and G predictor 130 may independently predict whether a lock operation is likely to be contended. The resulting predictions from both of the predictors are provided to a predictor logic 140, which may be a controller or the like, to combine the results in a desired manner. While shown with two separate predictors, the scope of the present invention is not so limited and additional predictors (or even a single one) may be present in some embodiments.

The final prediction generated by predictor logic 140 is provided to MOB 150 via a line 145. More specifically, the final prediction is provided to MOB control logic 180, which may be a controller or the like, which is used to control buffers within MOB 150, including a load buffer 160 and a store buffer 170. Load buffer 160 may be used to store load micro operations (µops) prior to their execution and to track prior loads or other memory operations that must be completed before the given memory operation itself can be completed. Similarly, store buffer 170 may be used to store memory operations, for example, store operations and to track prior memory operations (usually loads) that must be completed before a given memory operation itself can commit.

When an address of a load-lock operation is computed, the address corresponding to the lock variable may be provided to T predictor 120 via a line 162 from an execution unit 105 to initiate a prediction. Furthermore, the operation may be input into an entry of load buffer 160. This address provided to T predictor 120 may be used to access a lookup table 125 within T predictor 120 to output a count associated with the lock variable's address. This count may indicate the number of times contention has occurred on that lock variable during execution of the program. Of course, other information about the load-lock operation (such as its program counter) may also be provided to T predictor 120 to aid in table lookup.

As shown in FIG. 1, in some embodiments an additional line 163 may coupled between load buffer 160 and T predictor 120 to provide the address corresponding to the lock variable to T predictor 120. This line may be used for obtaining a prediction on a redispatch from load buffer 160.

As further shown in FIG. 1, the count from T predictor 120 may be provided to predictor logic 140 from T predictor 120. At the same time, the currently existing prediction of global contention within the thread is output from G predictor 130 and provided to predictor logic 140. Predictor logic 140 may combine these inputs to obtain a final prediction, which it then provides to MOB control logic 180.

In turn, MOB control logic 180 may process the lock operation based on the prediction. For example, MOB control logic 180 may determine whether or not to optimize the lock operation based on the final prediction. While MOB control logic 180 may handle execution of lock operations in various manners, if the prediction indicates that no contention is likely, MOB control logic 180 may implement optimizations on the lock operation. In contrast, if the prediction indicates that contention is likely, MOB control logic 180 may cause the lock operation to be executed conservatively.

In one embodiment, T predictor 120 may include a table 125 of addresses of lock variables that have encountered contention during program execution. While shown with a single table in the embodiment of FIG. 1, multiple tables may be present, each corresponding to a different thread. Alternately, a single table may be present and may include a thread identifier in each entry to associate the entries with corresponding threads.

Each entry of table 125 may have a saturating counter, for example, a two-bit saturating counter. When an address of a lock variable contends for the first time in a program, it is added to table 125, and the counter for the entry is initialized to zero. If the address corresponding to the lock variable again contends, the count of the entry may be incremented. If the count saturates during execution of the program, T predictor 120 may predict that every subsequent lock operation that accesses that lock variable is to be contended. In contrast, if an address is not stored within the table or the count associated with an entry in the table has not saturated, T predictor 120 may predict that the lock operation is to be uncontended.

In some embodiments, entries within table 125 may be overwritten due to table entry contention. Furthermore, in some embodiments the entire table may be periodically cleared. In one embodiment, a 128-entry table may be used for the table. In such an embodiment, table 125 may be direct mapped, with a 4-bit tag used for each entry. In one implementation, the lower six bits of a lock variable address may be masked out, and the next higher 7 bits of the address may be used as the index into the table, and the next 4 significant bits may be stored as the tag. Remaining bits of the address may be discarded.

During execution of a program, some lock variables contend very rarely, while others are contended frequently. In various embodiments, the saturating nature of the counter in T predictor 120 may capture this behavior. That is, frequently contended lock variables may quickly saturate the counter within T predictor 120, while lock variables that contend rarely will continue to be predicted as uncontended by T predictor 120. In other embodiments, a saturating up/down counter may be used. With such a counter, the counter entries may be incremented when the lock variable contends, and decremented when it does not contend. Then, logic within T predictor 120 may compare a count value to a threshold to determine whether a given lock operation is likely to be contended.

In one embodiment, G predictor 130 may include a global (G) counter 132 to indicate an amount of contention within a program. While shown in the embodiment of FIG. 1 as a single counter, multiple counters may be present, each associated with a different thread.

G predictor 130 may be used to indicate a global view of contention within the program. While described herein with respect to a program, in some embodiments G predictor 130 may analyze contention on a thread basis. Whenever a lock operation is contended, G counter 132 may be incremented. G predictor 130 may also include control logic to indicate a level of contention within the program. In one embodiment, the counter value may be compared to a first threshold and a second threshold. If the current count is below the first threshold, G predictor 130 predicts that contention within the program is low. If instead the counter value exceeds the first threshold but is lower than the second threshold, G predictor 130 may predict that contention in the program is at a medium level. If the current count is above the second threshold, G predictor 130 may predict that contention in the program is high. In one embodiment, the first threshold may be set to 5 and the second threshold may be set to 25, although the scope of the present invention is not so limited. More so, instead of sending a prediction to predictor logic 140, G predictor 130 may output the current count value of G counter 132 and predictor logic 140 may predict contention based on this value.

In some embodiments, counter 132 may be reset at intervals. Furthermore, counter 132 may be a saturating counter (i.e., prevented from overflowing). In such manner, G predictor 130 may capture the burstiness of contention within a program. That is, during certain portions of a program (e.g., a given number of instructions) contention may be high, while contention may be low (or medium) at different portions of the program. In such manner, G predictor 130 may thus capture the burstiness of contention. Furthermore, G predictor 130 may act as a watchdog mechanism against pathological contention scenarios arising from badly written code and the like. For example, G predictor 130 may predict contention based on its global view when table 125 in T predictor 120 is overwhelmed with too many locks to track.

As discussed above, counter 132 may be reset at various intervals. For example, in one embodiment it may be reset approximately every 30,000 processor cycles. In such an embodiment, a second counter (i.e., a reset (R) counter) 134 may be incremented every processor cycle, and when second counter 134 overflows, counter 132 may be reset. In one embodiment R counter 134 may be a 15-bit counter, also included within G predictor 130. In other embodiments, R counter 134 may be located outside G predictor 130. Furthermore, in other embodiments, G counter 132 may be a saturating up/down counter that is incremented when contention occurs and decremented when contention does not occur.

Thus independent predictions may be provided to predictor logic 140 from T predictor 120 and G predictor 130. Referring now to Table 1, shown is a state diagram that may be implemented in predictor logic 140. As shown in Table 1, predictor logic 140 may develop a final prediction based on the independent predictions.

TABLE 1

| G Component | T Component | Prediction |
| --- | --- | --- |
| High | Contended | Contended |
| Medium | Contended | Contended |
| Low | Contended | Uncontended |
| High | Uncontended | Contended |
| Medium | Uncontended | Uncontended |
| Low | Uncontended | Uncontended |

As shown in Table 1, G predictor 130 may act as a watchdog. When the global count of contention is high, contention may always be predicted regardless of an individual lock variable's contention history. Similarly, if G predictor 130 indicates that global contention is low, it is likely that individual lock variables will continue to not be contended, despite their history.

If instead G predictor 130 predicts that contention is moderate, the final prediction may be based on the particular lock variable's contention history (i.e., the output of T predictor 120). While shown with a particular implementation in Table 1, it is to be understood that in other embodiments predictions from the two independent predictors may be combined in other manners.

Figure 2:
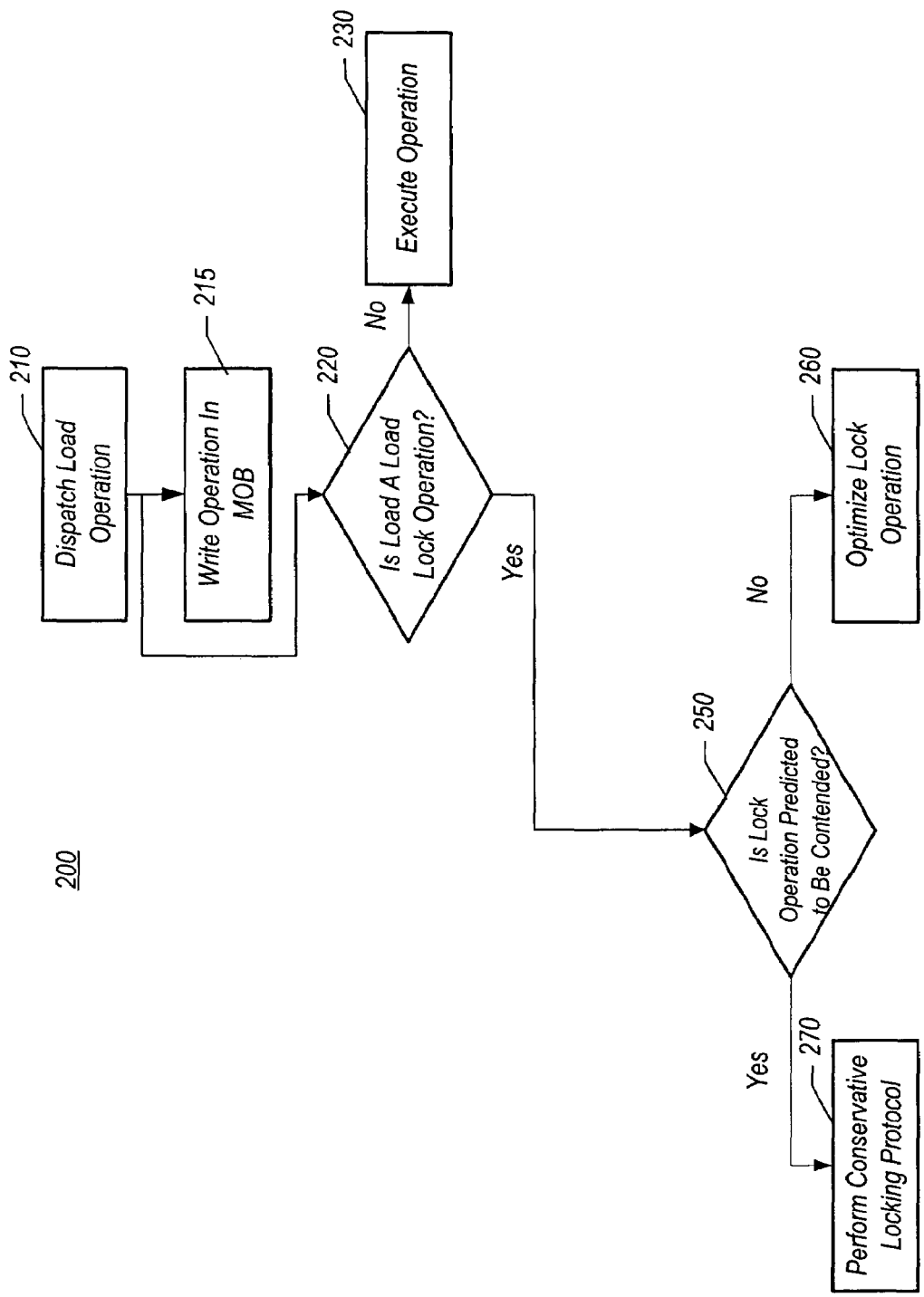
FIG. 2 is a flow diagram of a method in accordance with one embodiment of the present invention.

Referring now to FIG. 2, shown is a flow diagram of a method in accordance with one embodiment of the present invention. As shown in FIG. 2, method 200 is one implementation of a contention predictor, and may be used to determine whether contention is likely for a given lock operation. The lock operation may then be optimized if no contention is predicted. Method 200 may begin by receiving a load operation dispatched from a reservation station (block 210). This operation may be written into MOB 150 (block 215). At the same time, it may be determined whether the load is a load-lock operation (diamond 220). If it is not, the operation may be executed normally (block 230).

If instead it is determined that the load is a load-lock operation, control passes directly from diamond 220 to diamond 250, in which the address may be dispatched to the predictor to predict contention based on the address (diamond 250). For example referring back to the predictor of FIG. 1, the address of the lock variable may be provided from line 162 to T predictor 120. In turn, T predictor 120 may use the address (as described above) to access table 125 to determine whether the lock variable is contained therein. If so, the count associated with the lock variable is applied to logic in T predictor 120, which outputs a prediction to predictor logic 140, which also receives the current prediction from G predictor 130. In turn, predictor logic 140 may generate a final contention prediction based on these two inputs. The prediction is provided to MOB control logic 180.

Based on the prediction, a protocol may be initiated, as described further below. Based on the contention prediction at diamond 250, the protocol might block the actual operation if certain conditions are not met, while still allowing an optimized part (e.g., prefetch or elision) to proceed if the prediction is no contention.

If contention is predicted at diamond 250, a conservative locking protocol may be performed (block 270). For example, MOB 150 may wait for the load-lock operation in load buffer 160 to be the oldest μop, or wait for store buffer 170 to drain or a similar such procedure.

In contrast, if no contention is predicted, control passes from diamond 250 to block 260. There, the lock operation may be optimized (block 260). For example, the load-lock operation may be speculatively dispatched so that the cache line corresponding to the load variable is prefetched. Other similar such optimizations may also be implemented. For example, the load-lock micro operation and dependent micro operations may be speculatively executed before they become the oldest in the machine or before the store buffers are drained.

Further, in some embodiments upon redispatch from MOB 150, the predictor may be accessed, with control passing from diamond 220 to diamond 250 to re-check for a prediction. Alternately, the previous prediction may be stored and re-used.

During operation, MOB 150 monitors incoming snoops to determine whether any other thread or processor wants to access the same lock variable. MOB 150 continues this monitoring until the load lock micro operation has been retired from the machine. A snoop that occurs while MOB 150 is monitoring the lock variable would indicate mis-speculation and would require the re-execution of the load-lock and its dependent operations.

In one embodiment, actual contention of a load operation may be detected by having an additional indicator associated with entries within load buffer 160 to indicate contention. However, it is to be understood that contention may be detected in other manners in other embodiments.

When an entry in load buffer 160 is allocated for a load operation, the contention indicator (which may be a single contention bit) may be reset. If a snoop operation enters load buffer 160 corresponding to the load operation after the entry has been allocated and before the instruction has retired, the contention bit may be set. When the entry of load buffer 160 corresponding to the load operation is later deallocated (after the lock instruction has retired), the contention bit may be inspected to detect contention. More specifically, the entry and its associated contention bit may be passed to T predictor 120 and G predictor 130 to update them. That is, the counters within T predictor 120 and G predictor 130 may be incremented if the contention bit is set. In the embodiment of FIG. 1, a separate update channel 165 is present for such updates.

Figure 3:
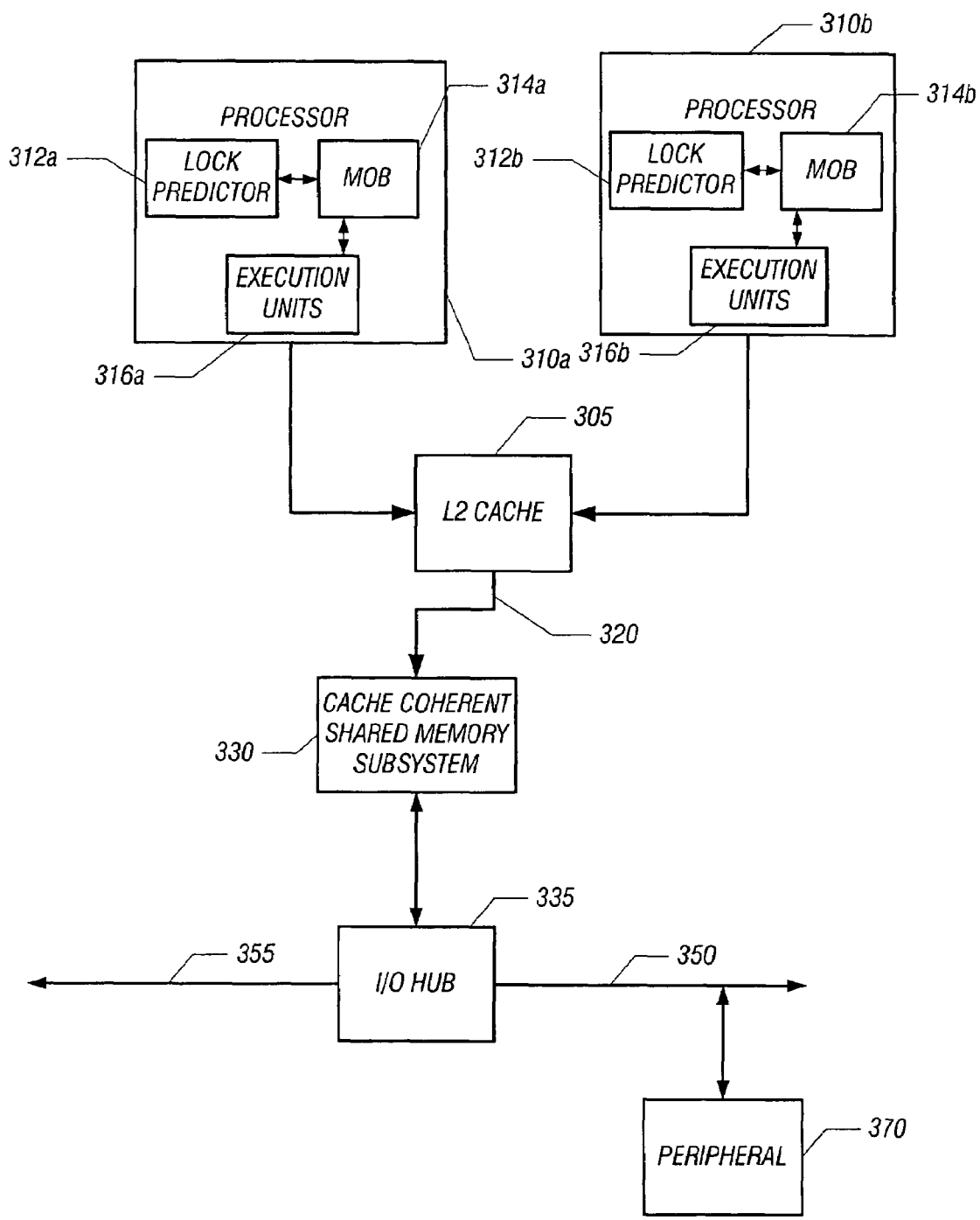
FIG. 3 is a block diagram of a system in accordance with one embodiment of the present invention.

Referring now to FIG. 3, shown is a block diagram of a representative computer system 300 in accordance with one embodiment of the invention. As shown in FIG. 3, computer system 300 includes a first processor 310a and a second processor 310b. Processor 310a may be coupled over a memory system interconnect 320 via a level 2 (L2) cache 305 to a cache coherent shared memory subsystem ("coherent memory") 330 in one embodiment. In one embodiment, coherent memory 330 may include a dynamic random access memory (DRAM) and may further include coherent memory controller logic to share coherent memory 330 between processors 310a and 310b.

It is to be understood that in other embodiments additional processors may be coupled to coherent memory 330. Furthermore in certain embodiments, coherent memory 330 may be implemented in parts and spread out such that a subset of processors within system 300 communicate to some portions of coherent memory 330 and other processors communicate to other portions of coherent memory 330.

As shown in FIG. 3, processor 310a may include a lock predictor 312a, a memory order buffer (MOB) 314a, and execution units 316a. As described above, lock predictor 312a may be coupled to MOB 314a to provide predictions of lock contention. Based on these predictions, MOB 314a may optimize a lock operation. The optimized operation may then be passed to execution units 316a, which may have pipeline stages to perform the operation. Information regarding the operation may then be passed back to MOB 314a to indicate that the operation is completed and ready for deallocation. At that time, MOB 314a may update lock predictor 312a with the contention status of the operation (i.e., contended or uncontended). Of course, additional components may be present in processor 310a, such as a level 1 (L1) cache.

As further shown in FIG. 3, similar processor components may be present in processor 310b, which may be a second core processor of a multiprocessor system. While shown in the embodiment of FIG. 3 as each including a predictor, in some embodiments only a single core may include such a predictor, which may be shared by multiple cores. Still further, in some embodiments, multithreaded applications may use a separate predictor for each thread. In yet other embodiments, a lock predictor may be present in a single processor system.

Coherent memory 330 may also be coupled (via a hub link) to an input/output (I/O) hub 335 that is coupled to an I/O expansion bus 355 and a peripheral bus 350. In different embodiments, I/O expansion bus 355 may be coupled to various I/O devices such as a keyboard and mouse, among other devices. Peripheral bus 350 may be coupled to various components such as peripheral device 370 which may be a memory device such as a flash memory, add-in card, and the like. Although the description makes reference to specific components of system 300, numerous modifications of the illustrated embodiments may be possible.

Figure 4:
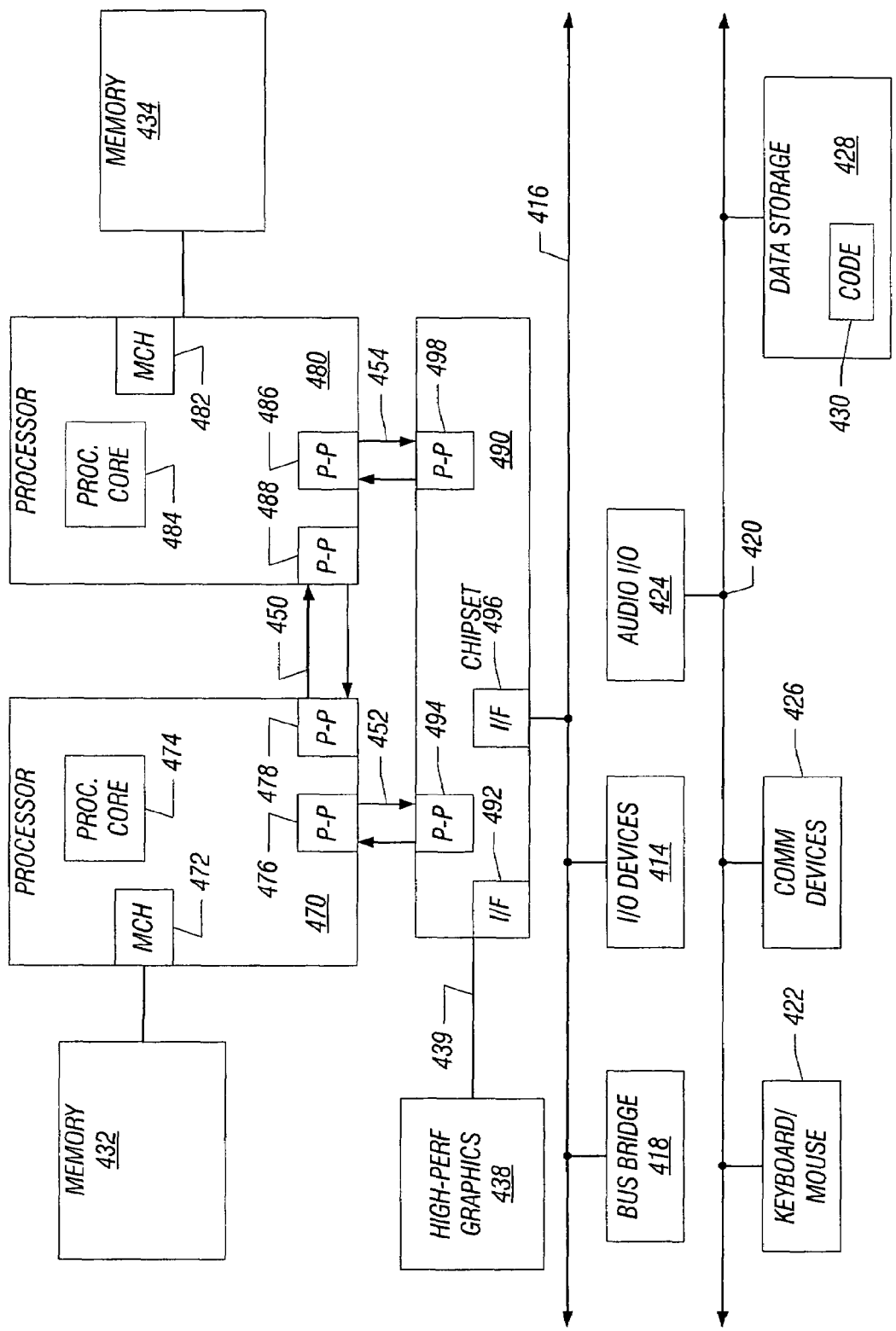
FIG. 4 is a block diagram of a multiprocessor system in accordance with another embodiment of the present invention.

In some embodiments, a multiprocessor system may be a point-to-point bus system, such as in a common system interface (CSI) system. Referring now to FIG. 4, shown is a block diagram of a multiprocessor system in accordance with another embodiment of the present invention. As shown in FIG. 4, the multiprocessor system is a point-to-point bus system, and includes a first processor 470 and a second processor 480 coupled via a point-to-point interconnect 450. First processor 470 includes a processor core 474, a memory controller hub (MCH) 472 and point-to-point (P-P) interfaces 476 and 478. Similarly, second processor 480 includes the same components, namely a processor core 484, a MCH 482, and P-P interfaces 486 and 488. Each processor 470 and 480 may include prediction circuitry in accordance with an embodiment of the present invention.

As shown in FIG. 4, MCH's 472 and 482 couple the processors to respective memories, namely a memory 432 and a memory 444, which may be portions of main memory locally attached to the respective processors.

First processor 470 and second processor 480 may be coupled to a chipset 490 via P-P interfaces 452 and 454, respectively. As shown in FIG. 4, chipset 490 includes P-P interfaces 494 and 498. Furthermore, chipset 490 includes an interface 492 to couple chipset 490 with a high performance graphics engine 438. In one embodiment, an Advanced Graphics Port (AGP) bus 439 may be used to couple graphics engine 438 to chipset 490. AGP bus 439 may conform to the *Accelerated Graphics Port Interface Specification, Revision* 2.0, published May 4, 1998, by Intel Corporation, Santa Clara, Calif. Alternately, a point-to-point interconnect 439 may couple these components.

In turn, chipset 490 may be coupled to a first bus 416 via an interface 496. In one embodiment, first bus 416 may be a Peripheral Component Interconnect (PCI) bus, as defined by the *PCI Local Bus Specification, Production Version, Revision* 2.1, dated June 1995 or a bus such as the PCI Express bus or another third generation I/O interconnect bus, although the scope of the present invention is not so limited.

As shown in FIG. 4, various input/output (I/O) devices 414 may be coupled to first bus 416, along with a bus bridge 418 which couples first bus 416 to a second bus 420. In one embodiment, second bus 420 may be a low pin count (LPC) bus. Various devices may be coupled to second bus 420 including, for example, a keyboard/mouse 422, communication devices 426 and a data storage unit 428 which may include, in one embodiment code 430. Further, an audio I/O 424 may be coupled to second bus 420.

Embodiments may be implemented in a computer program that may be stored on a storage medium having instructions to program a computer system to perform the embodiments. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions. Other embodiments may be implemented as software modules executed by a programmable control device.

While described herein as predicting contention based on an address of the lock variable, in other embodiments predictions may be based on a linear instruction pointer (LIP) (sometimes also referred to as the program counter) of the locking instruction. Still further, in other embodiments predictions may be based on some combination of the LIP and the address of the lock variable. In yet other embodiments, predictions may also incorporate information from past branch history/target information. Still further, contention predictions of other operations may be effected.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
    a first predictor to predict whether a lock operation is to be contended;
    a second predictor to indicate a level of contention in a program;
    a first controller to generate a combined prediction based on a result of the first predictor and the second predictor;
    control logic to receive the combined prediction and speculatively prefetch a lock variable for the lock operation if the combined prediction is indicative of no contention; and
    a dynamic random access memory (DRAM) coupled to the first predictor and to the second predictor to store the program.

2. The system of claim 1, wherein the first predictor comprises a storage to store at least a portion of addresses corresponding to lock variables of the program and a saturating count of contention occurrences thereof.

3. The system of claim 1, wherein the second predictor comprises a counter to count contention occurrences in the program.

4. The system of claim 3, further comprising a reset mechanism to reset the counter after a number of processor cycles to capture burstiness of contention within the program.

5. The system of claim 3, wherein the counter comprises an up/down counter.

6. A method comprising:
   independently predicting whether a lock operation is to be contended during execution using a first predictor and a second predictor, and combining a result of the first and second predictors; and
   optimizing the lock operation if the lock operation is not predicted to be contended by speculatively dispatching the lock operation to prefetch a lock variable associated with the lock operation from a cache memory.

7. The method of claim 6, further comprising inserting an address of a first contended lock variable into a first entry of the first predictor.

8. The method of claim 7, further comprising incrementing a count of the first entry of the first predictor if the first contended lock variable encounters contention again.

9. The method of claim 8, further comprising predicting contention for the first contended lock variable in the first predictor based on the count.

10. The method of claim 6, further comprising incrementing a counter in the second predictor if any lock operation of a program is contended.

11. The method of claim 6, further comprising setting a contention indicator in an entry of a buffer corresponding to the operation if the entry is snooped.

12. The method of claim 11, further comprising updating at least one of the first predictor and the second predictor based on the contention indicator.

13. The method of claim 11, further comprising receiving the contention indicator from the buffer on an update channel coupled between a predictor and the buffer.

14. The method of claim 6, further comprising independently predicting according to a first manner and a second manner.

15. The method of claim 6, further comprising speculatively performing the lock operation.

16. The method of claim 15, further comprising speculatively performing at least one dependent operation after speculatively performing the lock operation.

17. An article comprising a machine-readable storage medium containing instructions that if executed by a machine enable the machine to perform a method comprising:
   independently predicting in two manners contention of an operation to be executed;
   combining the independent predictions such that a combined prediction is based on a first prediction if the first prediction indicates a first or second level of contention, regardless of contention history of a lock variable associated with the operation, and the combined prediction is based on the contention history if the first prediction indicates a third level of contention between the first and second levels; and
   processing the operation based on the combined prediction.

18. The article of claim 17, wherein the method further comprises setting a contention indicator in an entry of a buffer corresponding to the operation if the entry is snooped.

19. The article of claim 18, wherein the method further comprises updating at least one of a first predictor and a second predictor based on the contention indicator.

20. An apparatus comprising:
   an execution unit to execute an operation, wherein the execution unit is to output an address corresponding to a lock variable for the operation to a first predictor to initiate a prediction;
   the first predictor to predict whether the operation is to be contended, the first predictor having a table with a plurality of entries, each entry including at least a portion of an address of a lock variable for the operation and a saturating count;
   a second predictor to indicate a global contention level, the second predictor including a global counter to count occurrences of contention in a program, the global counter resettable at various intervals of the program; and
   a predictor controller coupled to the first predictor and the second predictor to generate a final prediction based on an input from the first predictor and the second predictor such that the final prediction is based on a second prediction from the second predictor if the second prediction indicates a first or second level of contention, regardless of a first prediction from the first predictor, and the final prediction is based on the first prediction if the second prediction indicates a third level of contention between the first and second levels.

21. The apparatus of claim 20, further comprising an order controller coupled to receive the final prediction.

22. The apparatus of claim 21, wherein the order controller is to speculatively prefetch a lock variable corresponding to the operation if the final prediction is indicative of no contention.

23. The apparatus of claim 20, further comprising a reset mechanism to reset the global counter at the various intervals each corresponding to a number of cycles.

24. An apparatus comprising:
   an execution unit to execute an operation, wherein the execution unit is to output an address corresponding to a lock variable for the operation to a prediction unit to initiate a prediction;
   the prediction unit to predict contention of the operation, the prediction unit including a table to store address information corresponding to look variables and contention occurrences thereof during execution of a program, wherein the contention occurrences for each look variable is to be saturated according to a saturation counter, and a global counter to count each occurrence of contention in the program; and
   a buffer coupled to the prediction unit to store the operation in an entry and to perform a first lock protocol on the operation or an optimization on the operation based on the prediction received from the prediction unit.

25. The apparatus of claim 24, wherein the entry has a contention indicator associated therewith initiated to a first state when the operation is stored in the buffer.

26. The apparatus of claim 25, wherein the contention indicator is updated to a second state to indicate contention if the entry is snooped, and wherein the contention indicator of the second state is communicated to the prediction unit to update at least one of the table and the global counter.

27. The apparatus of claim 24, wherein the buffer is to wait until the operation is the oldest in the buffer before the operation is allowed to dispatch in the first lock protocol.

28. The apparatus of claim 24, wherein the buffer is to speculatively dispatch the operation to prefetch the lock variable from a cache in the optimization.

29. The apparatus of claim 24, wherein the prediction unit is to predict that the operation is contended if the global counter indicates a first level of global contention, regardless of the contention occurrences for the lock variable of the operation.

30. The apparatus of claim 29, wherein the prediction unit is to predict contention of the operation based on the contention occurrences for the lock variable of the operation if the global counter indicates a second level of global contention, the second level less than the first level.

31. The apparatus of claim 24, wherein the global counter is to be reset at intervals of the program to capture Thirstiness of contention within the program.

\* \* \* \* \*

UNITED STATES PATENT AND TRADEMARK OFFICE
CERTIFICATE OF CORRECTION

PATENT NO. : 7,516,313 B2
APPLICATION NO. : 11/027392
DATED : April 7, 2009
INVENTOR(S) : Bratin Saha et al.

Page 1 of 1

It is certified that error appears in the above-identified patent and that said Letters Patent is hereby corrected as shown below:

Col. 9:
Line 24, "the operation" should be --the lock operation--;

Col. 10:
Line 38, "look" should be --lock--;
Line 40, "look" should be --lock--;

Col. 12:
Line 2, "Thirstiness" should be --burstiness--.

Signed and Sealed this
Thirteenth Day of November, 2012

David J. Kappos
*Director of the United States Patent and Trademark Office*